(12) United States Patent
Garber

(10) Patent No.: US 6,236,750 B1
(45) Date of Patent: May 22, 2001

(54) SYSTEM AND METHOD FOR VARYING THE COLOR OF REFLECTIVE OBJECTS IN DIGITIZED IMAGES

(75) Inventor: David G. Garber, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/107,020

(22) Filed: Jun. 30, 1998

(51) Int. Cl.⁷ ........................................................ G06K 9/00
(52) U.S. Cl. ............................................ 382/162; 382/167
(58) Field of Search ............................ 382/162, 167; 358/518, 520, 523; 345/431

(56) References Cited

U.S. PATENT DOCUMENTS

| | | | |
|---|---|---|---|
| 5,334,992 | * | 8/1994 | Rochat et al. ........................ 345/22 |
| 5,630,038 | * | 5/1997 | Itoh et al. ........................... 345/431 |
| 5,909,220 | * | 6/1999 | Sandow ............................... 345/431 |

\* cited by examiner

Primary Examiner—Phuoc Tran
(74) Attorney, Agent, or Firm—Lee & Hayes, PLLC

(57) ABSTRACT

A method of allowing an Internet user to change the color of an object within an image includes a design phase in which a designer identifies pixels forming the object. This phase includes specifying a base color and ranges of hues, luminances, and saturations around those of the base color. Any pixels in these ranges are selected as part of the image and an HLS differential is calculate for each of the selected pixels. An HLS differential includes a hue component, which in turn includes a target hue toward which the pixel is tinted relative to a base hue of the object. The hue component also includes a variation degree indicating a degree by which the pixel is tinted from the base hue toward the target hue. The HLS differential also includes luminance and saturation components indicating luminance and saturation variations from the luminance and saturation of the base color. The HLS differentials are transmitted to requesting clients instead of the nominal pixel values, and the client uses the HLS differentials in conjunction with a new base color specified by a user to calculate actual pixel values.

23 Claims, 4 Drawing Sheets

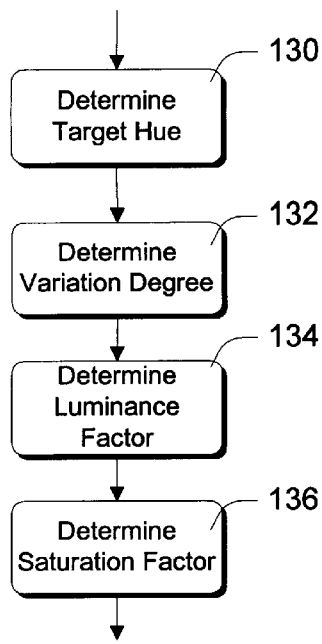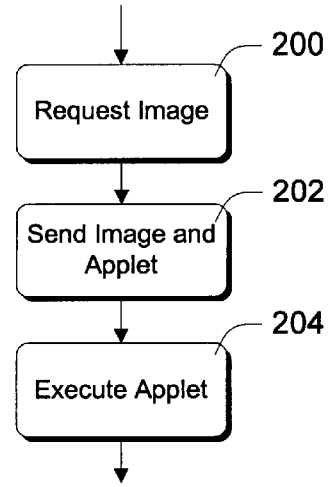
Fig. 5
Fig. 6
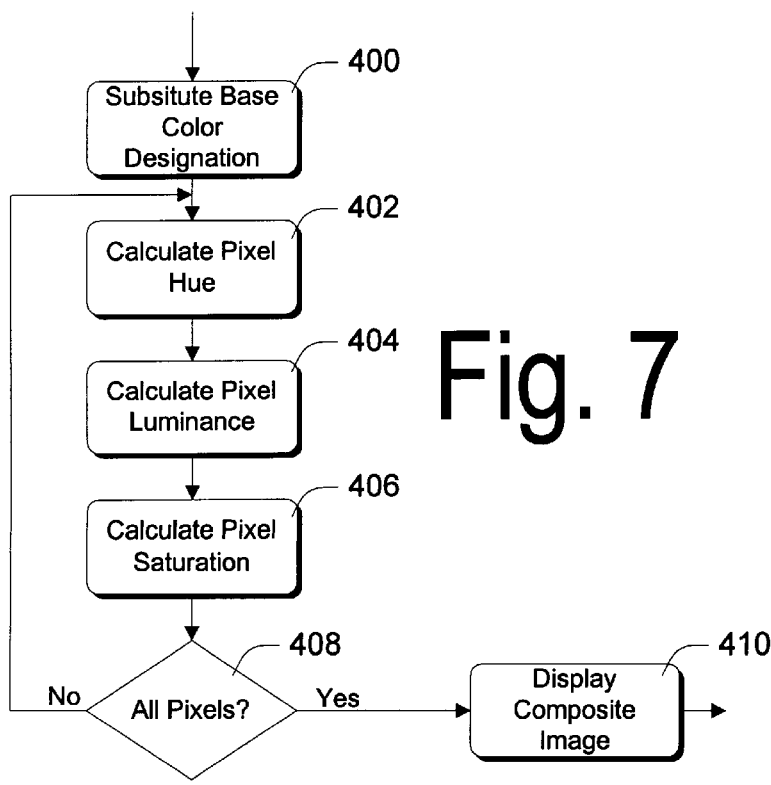
Fig. 7

SYSTEM AND METHOD FOR VARYING THE COLOR OF REFLECTIVE OBJECTS IN DIGITIZED IMAGES

TECHNICAL FIELD

This invention relates to systems and methods of creating and providing different digitized views of an image, wherein an object in the image is shown in a different color in each view.

BACKGROUND OF THE INVENTION

The Internet is quickly becoming an important resource for various types of information. Before buying an expensive consumer product, for example, many consumers use the Internet to obtain detailed information, reviews, and comparisons regarding the product.

In the automobile environment, as an example, many potential buyers appreciate the ability to view pictures of different automobiles before making a final purchasing decision. General Motors is an example of an automobile manufacturer that has provided a Web site with this functionality—an example is found at "http://www.gmc.com/jimmy/jm_color2.htm". The Web page example found at this URL (uniform resource locator) has a small image of a car, along with smaller color samples. As the user moves a mouse pointer over the color samples, the car automatically changes colors to match the sample.

Although a vast amount of information is available through the Internet, available bandwidth is often inadequate for delivering this information in a convenient time frame. Thus, the General Motors Web site page mentioned above loads rather slowly. An examination of the HTML source code for the referenced HTML page indicates that the page works by downloading a separate image for each of the different color options. As a user selects a different color, the image is completely replaced with a different image that has been previously downloaded in its entirety. Thus, eight entire car images must be preloaded to provide the ability to change between different colors. Although this scheme works, it does not make efficient use of available bandwidth.

Furthermore, current automated methods of digitally changing the color of an object in an image generally produce unacceptable results with objects such as automobiles that have highly reflective surfaces. Acceptable results can be obtained by an artist, but only with considerable manual effort. Alternatively, separate pictures must be taken for each car color. This is quite costly.

The invention, however, allows a car color to be electronically changed with little work by a graphics designer. Furthermore, the described method is very effective with highly reflective automobile surfaces.

SUMMARY OF THE INVENTION

The invention allows a network client to download an image once, and to then calculate pixel colors at the client to change an object in the picture to different colors. Much of the actual conversion work, however, is performed before the client receives the image. The particular method is especially effective when used with reflective surfaces such as those found on an automobile.

The process starts with a design procedure in which a designer identifies those pixels that are part of an object that will be subject to color changes. This design procedure is automated. First, the designer selects a pixel in the object that represents a base color of the object. The designer then specifies ranges of allowable HLS (hue, luminance, and saturation) values around the HLS values of the base color. Any pixels having HLS values within the specified ranges are selected as part of the object whose color will be changeable. This is an interactive process, in which the designer alters the ranges until the proper pixels have been identified and verified visually.

The design procedure continues with an automated process of calculating an HLS differential for each pixel of the selected object. The HLS differential includes a hue component, a luminance component, and a saturation component.

The hue component of the HLS differential for an individual pixel contains a target hue and a variation degree. A target hue is a hue toward which the pixel is tinted from the hue of the selected base color. For example, an object with a red base color might have certain pixels that are tinted from red toward green. If so, green is chosen as the target hue. The variation degree is the degree by which the pixel's hue is tinted from the hue of the base color, indicated as a percentage of the difference between the base color hue and the target hue.

The luminance component of the HLS differential indicates the difference between the luminance value of a particular pixel and the base color luminance. The saturation component indicates the difference between the saturation value of a particular pixel and the base color saturation.

When a client requests a particular image from a server, the server provides both background and foreground portions of the image. The foreground image contains those pixels that were selected as part of the design process described above, which are specified as HLS differentials. The background portion contains the remaining pixels, which are specified in conventional terms such as RGB or HLS values.

The server also provides an executable component such as a JavaScript applet that performs a rendering process at the client. The applet accepts a base color selection from a user, and then calculates each pixel of the foreground image based on the base color and the HLS differentials. An individual pixel is calculated by shifting the selected base color by the components of the pixel's HLS differential. The hue value of the pixel is obtained by shifting or tinting the hue of the selected base color toward the pixel's target hue by the pixel's variation degree. The luminance and saturation values are obtained by adjusting the luminance and saturation values of the selected base color by the luminance and saturation components specified in the HLS differentials.

The pixels are recalculated and displayed every time a user selects a new base color.

BRIEF DESCRIPTION OF THE DRAWINGS

FIG. 5 is a flowchart showing steps in calculating HLS differentials in accordance with the invention.

FIG. 6 is a flowchart showing steps performed by a network system in accordance with the invention.

FIG. 7 is a flowchart showing steps performed by a client to display an image in accordance with the invention.

DETAILED DESCRIPTION

Figure 1:
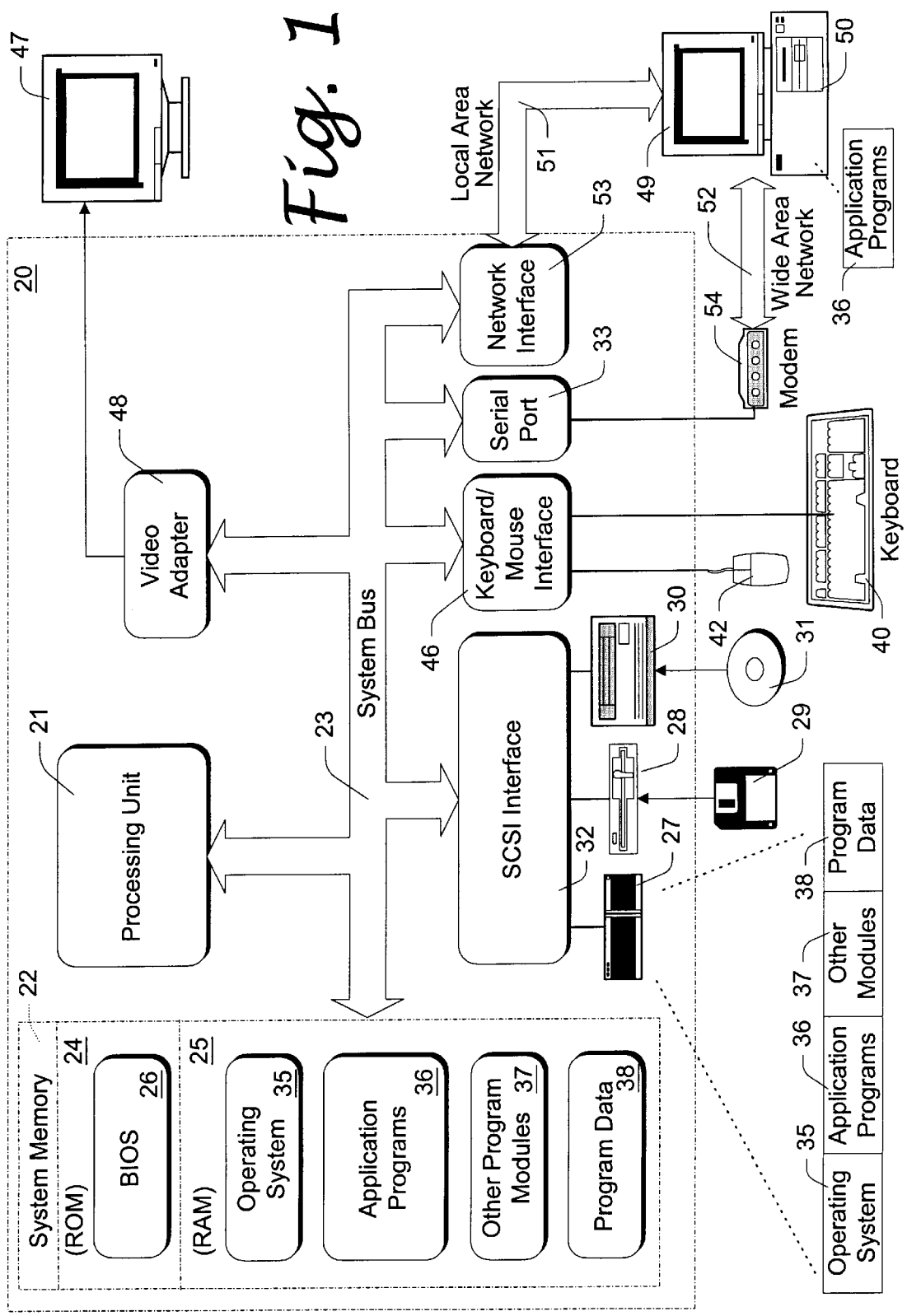
FIG. 1 is a block diagram of a network system in accordance with the invention.

FIG. 1 shows a network system in accordance with the invention. FIG. 1 and the related discussion provide a brief, general description of a suitable computing environment in which the invention may be implemented. Although not required, the invention will be described in the general context of computer-executable instructions, such as program modules, being executed by a conventional personal computer that is configured in a network environment as a server. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. In a distributed computer environment, program modules may be located in both local and remote memory storage devices.

With reference to FIG. 1, an exemplary system for implementing the invention includes a general purpose computing device in the form of a network server computer 20, including one or more processors or processing units 21, a system memory 22, and a system bus 23 that couples various system components including the system memory to processors 21.

The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within server computer 20, such as during start-up, is stored in ROM 24. The server computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by an SCSI interface 32 or some other appropriate interface. The drives and their associated computer-readable media provide nonvolatile storage of computer readable instructions, data structures, program modules and other data for the server computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29 optical disk 31, ROM 24, or RAM 25, including an operating system 35, one or more application programs 36, other program modules 37, and program data 38. A user may enter commands and information into the server computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to the system bus. A monitor 47 or other type of display device is also connected to the system bus 23 via an interface, such as a video adapter 48. In addition to the monitor, personal computers typically include other peripheral output devices (not shown) such as speakers and printers.

The server computer 20 operates in a networked environment using logical connections to one or more remote client computers, such as a client computer 49. The client computer 49 may be another personal computer, a server, a router, a network PC, a peer device or other common network node, and typically includes many or all of the elements described above relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets, and the Internet. In the described embodiment of the invention, client computer 49 executes an Internet Web browser program such as the Internet Explorer Web browser manufactured and distributed by Microsoft Corporation of Redmond, Wash.

When used in a LAN networking environment, the server computer 20 is connected to the local network 51 through a network interface or adapter 53. When used in a WAN networking environment, the server 20 typically includes a modem 54 or other means for establishing communications over the wide area network 52, such as the Internet. The modem 54, which may be internal or external, is connected to the system bus 23 via a serial port interface 33. In a networked environment, program modules depicted relative to the personal computer 20, or portions thereof, may be stored in the remote memory storage device. It will be appreciated that the network connections shown are exemplary and other means of establishing a communications link between the computers may be used.

Generally, the data processors of computer 20 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

In accordance with the invention, application programs 36 include a server application program that provides resources and services to various requesting remote clients. Specifically, the server application acts as an Internet Web server, providing various "documents" (also referred to as "pages") containing multimedia information.

The following discussion assumes that image pixels are represented in an HLS (hue, saturation, and luminance) format. It is recognized that other formats are commonly used in computer systems. For example, an RGB (red, green, blue) color format is often used in conjunction with popular personal computers. However, simple procedures for converting between different formats are well known. The discussion that follows assumes a familiarity with color representation schemes and with methods of converting between such schemes. Thus, conversion to an HLS format is considered to be implicit in the following discussion.

Figure 2:
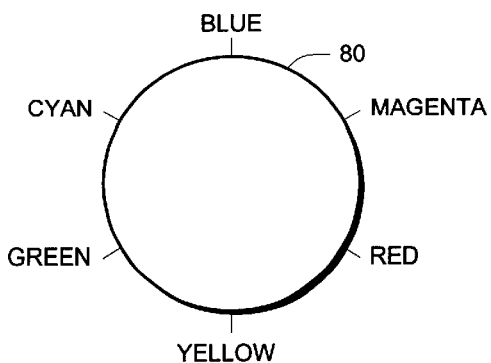
FIG. 2 shows a circular hue spectrum as defined in accordance with the invention.

Conceptually, the described embodiment of the invention makes use of a continuous, circular hue spectrum 80 as illustrated in FIG. 2, in which different hues are represented at different positions along the circle. The hue spectrum represents a full range of major hues in the following order: blue, magenta, red, yellow, green, and cyan. These major hues repeat themselves as the circle is repeated. In the described embodiment, the major hues are spaced at regular, equal intervals, referred to as hue intervals. Each hue interval is 60° around the hue spectrum in the described embodiment of the invention.

In actual implementation, each position along the circle is assigned a numerical value, starting with zero at the top, proceeding to 120 at the bottom, and then to 240 back at the top. The top position can be considered to be equal to either zero, 240, or –240.

The major hues are thus separated from each other numerically by intervals of forty. Blue has values of zero, 240, or –240; magenta has values of 40 or –200; red has values of 80 or –160; yellow has values of 120 or –120; green has values of 160 or –80; and cyan has values of 200 or –40. The range of hues is considered to be continuous across the top of the circle, so that the numerical difference between cyan and magenta is 80.

The following discussion will describe certain particular pixels or hues as being shifted or tinted "toward" a target hue, relative to a base hue. This means that a pixel's hue is located toward the target hue on the circular color spectrum, relative to a base hue—the pixel's hue is located on the hue spectrum of FIG. 2 somewhere along the shortest arc between the base hue and the target hue.

Figure 3:
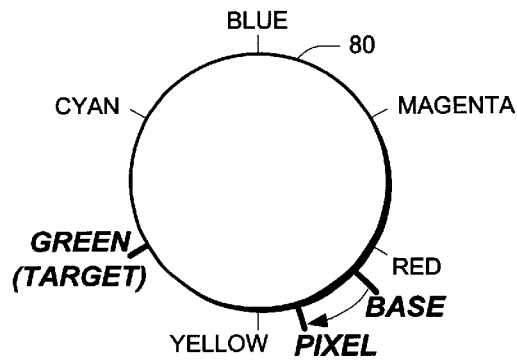
FIG. 3 shows an example in accordance with the invention, relative to the hue spectrum of FIG. 2.

As an example, FIG. 3 shows the position of a pixel hue (labeled "PIXEL") that is tinted toward a yellow target hue from a defined base (labeled "BASE"). In this case, the pixel hue can be said to be tinted toward either yellow or green.

Figure 4:
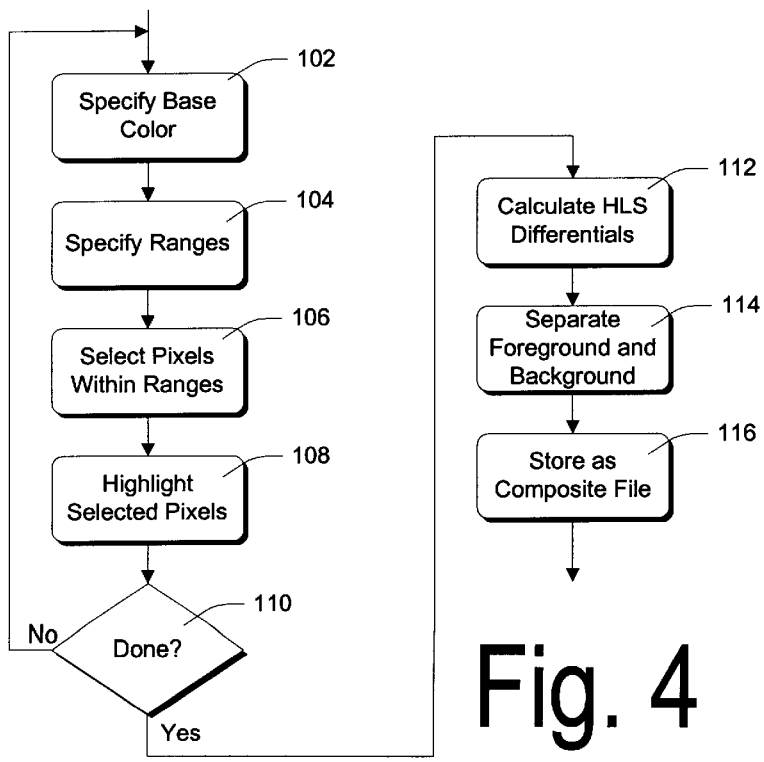
FIG. 4 is a flowchart showing preferred design steps in accordance with the invention.

FIG. 4 shows steps performed in a design phase of the invention. The design phase is implemented by an application program that solicits input from a human designer. A first part of the design phase comprises identifying pixels in an image that represent the object whose color will be varied. In the case of an automobile, the object is actually the "colorful" parts of the automobile—generally the painted exterior portions. Portions such as mirrors, bumpers, windows, and trim are not considered to be part of the object whose color will be manipulated.

Step 102 comprises specifying a base color. This step is performed by a designer. The base color is selected by selecting an image pixel that represents the ideal or nominal color of the underlying object—a pixel that is not affected by reflections, shading, or other tinting away from the nominal color of the object. The base color includes hue, luminance, and saturation components, and thus defines a base hue, a base luminance, and a base saturation that will be used in succeeding steps.

Step 104 comprises specifying ranges around the base hue, the base luminance, and the base saturation. The ranges indicate colors that are similar enough to the base color to be considered part of the object. This step is performed by the designer.

Step 106 comprises selecting any pixels having hues, luminances, and saturations within the specified ranges. These are the pixels that will be considered to be part of the object whose color is variable.

Step 108 comprises displaying the image to the designer, with the selected pixels somehow delineated or highlighted for visual verification. As indicated by decision block 110, steps 102, 104, 106, and 108 are repeated until the desired pixels have been selected.

Step 112 comprises calculating an HLS differential for each of the pixels selected in step 106. Specific steps in calculating the HLS differential will be discussed below. Step 114 comprises separating the image into a background image and a foreground image. The background image is a compressed version of the overall image (using HLS pixel values), with any pixels selected in step 106 set to black. The foreground image comprises only those pixels selected in step 106, wherein the pixels are represented as HLS differentials as calculated in step 112.

Step 116 comprises storing the image on a non-volatile storage medium such as a hard disk of a server, as a composite that includes both the foreground image and the background image.

FIG. 5 shows steps performed when calculating an HLS differential for an individual pixel. Note that the steps of FIG. 5 are performed for every pixel of the object whose color is changeable. The individual pixel that is the object of the steps of FIG. 5 will be referred to in the following discussion as the "current pixel." The term "current color" will be used to refer to the color of the current pixel. The terms "current hue," "current luminance," and "current saturation" will be used to reference the hue value, the luminance value, and the saturation value of the current color.

A step 130 comprises determining a target hue toward which the current pixel is tinted, relative to the base hue specified in step 102. Generally, the target hue can be any hue that is less than 180° from the current hue on the hue spectrum discussed above, such that the current hue lies on the hue spectrum along the shortest arc between the base hue and the target hue (note, however, the special case described below where the current hue actually lies on the hue spectrum along the longest arc between the base hue and the target hue). Preferably, however, the target hue is selected to be within 120° of the current hue along the hue spectrum. In the embodiment described herein, the target hue is one of the major hues that is spaced along the hue spectrum from the current hue by no more than two hue intervals. In other words, the target hue is the first major hue along the hue spectrum from the current hue that also meets the condition of being at least the second major hue from the base hue. Generally, then, the target hue will be either the first or second major hue from the current hue in the same direction as the current hue from the base hue.

A step 132 comprises determining a degree (referred to herein as a variation degree) by which the current pixel is tinted from the base hue toward that pixel's target hue. In the embodiment described herein, the variation degree is specified as a fraction of the difference between the base hue and the pixel's target hue.

Referring back to FIG. 3 as an example, assume that the pixel hue is an orange/red, having a numerical value of 110, between major hues red and yellow. Assume as shown that a hue more towards red, having a numerical value of 90, has been selected as the base hue. The current pixel's hue is clockwise from the base hue, and the target hue is chosen as the first major hue from the current hue, in this same direction, that is more than one hue interval from the base hue: the first major hue in this direction that is greater than one hue interval from the base hue is green. Therefore, the target hue is green, which has a numerical value of 160. The absolute difference between the base hue and the target hue is 70 (absolute value of 160–90). The absolute difference between the base hue and the current hue is 20 (110–90). Thus, the hue variation degree for this pixel is 20/70.

There is rare case that potentially requires special handling, when the target hue is more than 180° from the base hue. Suppose, for example, that the base hue is equal to 75 (slightly counter-clockwise from red), and the current hue is 165 (slightly clockwise from green). In this case, the target hue is cyan, having a value of 200: cyan is the first major hue from the current hue in the direction from the base hue to the current hue, and is also at least the second major hue from the base hue (in this case, it is actually the fourth major hue from the base hue). The shortest difference between the target hue and the base hue is –115 (going counterclockwise from the base color to cyan). However, for consistency in the remaining calculations, the difference is calculated along a clockwise path from the base hue to the target hue—in the same direction as the direction from the base hue to the current hue. Thus, the current hue lies along the longest path from the base hue to the target hue. The difference between the current hue and the base hue is 90. Accordingly, the hue variation degree in this case is 90/125.

Step 134 comprises calculating a luminance variance or factor for the current pixel. The luminance factor specifies the difference in luminance between the current pixel and the base luminance.

Step 136 comprises calculating a saturation variance or factor for the current pixel. The saturation factor specifies the difference in saturation between the current pixel and the base saturation.

An HLS differential for a particular pixel includes the target hue for that pixel, the variation degree, the luminance factor, and the saturation factor.

In actual implementation, the variation degree, the luminance factor, and the saturation factor are formatted for convenient integer operations. Furthermore, various flags are used in addition to the actual components described above.

The hue component of the HLS differential includes three bits indicating the target hue. An 8-bit number is used to express the variation degree in $256^{ths}$ of the distance between the base hue and the target hue.

Two flag bits are dedicated to luminance. They can be set to one of three possible values: "inactive," "black," and "white." "Inactive" means that the current luminance is identical to the base luminance. "White" means that the current color is lighter than the base color, while "black" means that the current color is darker. The luminance factor is then specified as a fraction (in $256^{ths}$) of the difference between the base luminance and either total white or total black.

Two more flag bits are dedicated to saturation. They can be one of three possible values: "inactive," "color1", or "color2". "Inactive" means that the current saturation is identical to the base saturation. "Color1" means that the original base saturation is relatively colorful, and that all other colors are specified in $64^{ths}$ of that base color (from $0/64^{ths}$ to $255/64^{ths}$. "Color2" means that the original base saturation is relatively less colorful, and that other colors can potentially be more than four times as colorful. Thus, for "color2," all other colors are specified in $16^{ths}$ (ranging from $1/16^{ths}$ to $255/16^{ths}$) of the base color. If the base color has such a low saturation that other colors might be extremely more colorful, no saturation factor is recorded. Thus, the method assumes that the original base color is not black, white or gray.

FIG. 6 shows general steps performed by a network system in accordance with the invention, assuming that the design procedure described above has already been completed, and that a server has access to a plurality of stored and pre-processed images as described above. A step 200, performed by a client computer, comprises requesting a particular image. The requesting step is performed in accordance with conventional Internet protocols.

The server responds with a step 202 of sending an HTML-formatted page to the client. This page includes the requested image, in the composite format described above that include both a background image and a foreground image with HLS differentials. The server also sends HLS values of a palette of colors from which the user can choose. Furthermore, the server sends an executable component such as an "ActiveX" control which can be executed by the client to perform actual color manipulations. The HTML-formatted page is formatted in accordance with the desired appearance of the finished display image.

The executable component is executed at the client in step 204, by the client's Internet browsing software, to display the provided image and to change the colors of the image's "foreground" whenever the user chooses a new base color.

The specific steps performed by the executable component are shown in FIG. 7. A first step 400 comprises accepting a designation of a substitute base color from the user. The user's selection is preferably made from a menu or palette of available base colors, provided by the server. The selected base color inherently includes a base hue, a base saturation, and a base luminance. The applet then calculates a new pixel color for each pixel of the foreground image, based upon the substitute base color specified by the user and upon the HLS differential specified for the pixel.

More specifically, a step 402 comprises calculating a pixel hue for a particular pixel based upon the substitute base hue and upon the hue component of the HLS differential specified for the pixel. Specifically, this step comprises tinting the substitute hue toward the pixel's target hue by the specified variation degree—by the specified fraction of the difference between the substitute base hue and the target hue of the individual pixel. Note that this step does not assume any fixed direction around the circular hue spectrum. For some substitute base colors, the tinting might occur in a clockwise direction. For other substitute base colors, the tinting might occur in a counter-clockwise direction. The particular direction of tinting depends on the relationship between the substitute base hue and the target hue of the particular pixel. Furthermore, the step does not assume a fixed distance around the hue spectrum. Rather, the distance is specified as a fraction of the distance between the substitute base hue and the target hue: if the selected substitute base hue is relatively close to the target hue of the pixel, there will be very little tinting. If the selected substitute base hue is relatively distant from the target base hue of the pixel, there will be more significant tinting.

Figure 8:
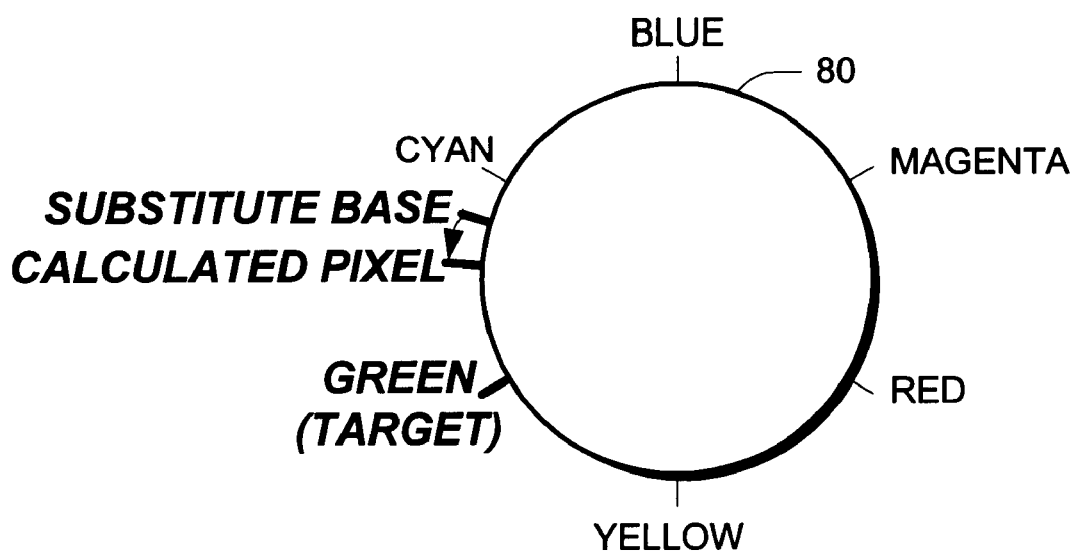
FIG. 8 continues the example of FIG. 3, again relative to the hue spectrum of FIG. 2.

Continuing the example of FIG. 3, now with reference to FIG. 8, assume that the user has selected a new base hue between cyan and green, having a numerical value of 190. The target hue is green (numerical value 160), and the variation degree is 20/70. The new pixel will have a hue that is 20/70 of the distance from the new base hue to the target hue: 190−20/70*(190−160), or about 181. Note that any newly calculated hue will be along the shortest arc between the substitute base hue and the target hue.

Step 404 comprises calculating a new pixel luminance for the current pixel, based on the substitute luminance and the luminance factor corresponding to the pixel. The new pixel luminance is equal to the substitute luminance adjusted or factored by the luminance variance as described above.

Step 406 comprises calculating a new pixel saturation for the current pixel, based on the substitute saturation and the saturation factor corresponding to the pixel. The new pixel saturation is equal to the substitute saturation adjusted or factored by the saturation variance as described above.

As indicated by decision block 408, these steps are repeated for every pixel of the foreground image.

Step 410 comprises displaying the composite image by overlying the calculated foreground image over the background image.

The described steps allow an image to be transmitted efficiently to a client computer, whereupon the client computer takes the steps necessary to display the image in whatever color is selected by a user. The image is transmitted in a format that is easily manipulated to form different colors, and thus imposes little delay when the user changes from one color to another. However, the invention avoids the need to send a different version of the image for each available color. Furthermore, the range of colors available to the user can be very large without increasing transmission times. Additionally, the described method of color transformation is extremely effective with reflective surfaces such as found on automobiles, even though images with such surfaces have been difficult to manipulate using prior art techniques.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of changing an object in an image from one color to a new color, comprising the following steps:
   identifying pixels in the image that represent the object, wherein the identified pixels have hues that are tinted toward different hues from a base hue of the object;
   for each identified pixel, determining a target hue toward which that pixel is tinted relative to the base hue;
   for each identified pixel, determining a degree by which that pixel is tinted from the base hue toward that pixel's target hue;
   calculating a new pixel hue for each identified pixel based upon a substitute hue;
   wherein the calculating step for a particular pixel comprises tinting the substitute hue toward the pixel's target hue by the pixel's determined degree to obtain the new pixel hue.

2. A method as recited in claim 1, wherein the determined degree for a particular pixel is specified as a fraction of the difference between the base hue and the pixel's target hue.

3. A method as recited in claim 1, wherein the identified pixels have luminances that vary from a base luminance of the object and saturations that vary from a base saturation of the object, the method further comprising the following steps:
   calculating a luminance variance for each identified pixel, wherein the luminance variance indicates the difference in luminance between the identified pixel and the base luminance;
   calculating a saturation variance for each identified pixel, wherein the saturation variance indicates the difference in saturation between the identified pixel and the base saturation;
   calculating a new pixel luminance for each identified pixel based on a substitute luminance, wherein the new pixel luminance is equal to the substitute luminance adjusted by the luminance variance;
   calculating a new pixel saturation for each identified pixel based on a substitute saturation, wherein the new pixel saturation is equal to the substitute saturation adjusted by the saturation variance.

4. A method as recited in claim 1, wherein the step of identifying pixels in the image comprises:
   specifying a range of hues around the base hue;
   selecting any pixels having hues within the specified range of hues.

5. A method as recited in claim 1, wherein the step of identifying pixels in the image comprises:
   specifying ranges of hues, luminances, and saturations;
   selecting any pixels having hues, luminances, and saturations within the specified ranges.

6. A method as recited in claim 1, wherein the step of identifying pixels in the image comprises:
   specifying ranges of hues, luminances, and saturations around the hue, luminance, and saturation of a base color;
   selecting any pixels having hues, luminances, and saturations within the specified ranges.

7. A computer-readable storage medium containing instructions that are executable by a computer to change an object in an image from one color to a new color, the instructions performing steps comprising:
   defining a circular hue spectrum representing different possible hues of the identified pixels, wherein the hue spectrum includes at least six major hues that are spaced from each other at hue intervals along the circular hue spectrum;
   identifying pixels in the image that represent the object, wherein the identified pixels have hues that are tinted toward different hues from a base hue of the object;
   for each identified pixel, determining a target hue toward which that pixel is tinted relative to the base hue, wherein the target hue is one of the major hues that is spaced along the circular hue spectrum from the base hue by at least one hue interval;
   for each identified pixel, determining a degree by which that pixel is tinted from the base hue toward that pixel's target hue;
   calculating a new pixel hue for each identified pixel based upon a substitute hue;
   wherein the calculating step for a particular pixel comprises tinting the substitute hue toward the pixel's target hue by the pixel's determined degree to obtain the new pixel hue.

8. A computer-readable storage medium as recited in claim 7, wherein the six major hues are spaced from each other by equal hue intervals along the circular hue spectrum.

9. A computer-readable storage medium as recited in claim 7, wherein the major hues are blue, magenta, red, yellow, green, and cyan.

10. A computer-readable storage medium as recited in claim 7, wherein the major hues are blue, magenta, red, yellow, green, and cyan, and these major hues are spaced from each other by equal hue intervals along the circular hue spectrum.

11. A computer-readable storage medium as recited in claim 7, wherein the determined degree for a particular pixel is specified as a fraction of the difference between the base hue and the pixel's target hue.

12. A computer-readable storage medium as recited in claim 7, wherein the identified pixels have luminances that vary from a base luminance of the object and saturations that vary from a base saturation of the object, the steps further comprising:
 calculating a luminance variance for each identified pixel, wherein the luminance variance indicates the difference in luminance between the identified pixel and the base luminance;
 calculating a saturation variance for each identified pixel, wherein the saturation variance indicates the difference in saturation between the identified pixel and the base saturation;
 calculating a new pixel luminance for each identified pixel based on a substitute luminance, wherein the new pixel luminance is equal to the substitute luminance adjusted by the luminance variance;
 calculating a new pixel saturation for each identified pixel based on a substitute saturation, wherein the new pixel saturation is equal to the substitute saturation adjusted by the saturation variance.

13. A computer-readable storage medium as recited in claim 7, wherein the step of identifying pixels in the image comprises:
 specifying a range of hues around the base hue;
 selecting any pixels having hues within the specified range of hues.

14. A computer-readable storage medium as recited in claim 7, wherein the step of identifying pixels in the image comprises:
 specifying ranges of hues, luminances, and saturations;
 selecting any pixels having hues, luminances, and saturations within the specified ranges.

15. A computer-readable storage medium as recited in claim 7, wherein the step of identifying pixels in the image comprises:
 specifying ranges of hues, luminances, and saturations around the hue, luminance, and saturation of a base color;
 selecting any pixels having hues, luminances, and saturations within the specified ranges.

16. A network system comprising:
 a network server having a plurality of digitized images that are provided to clients upon request, the network server being programmed to provide an individual image in a format comprising:
  a background image comprising a plurality of pixels;
  a foreground image of an object that can be changed to different colors, the foreground image comprising a plurality of pixels;
  wherein each of the foreground image pixels comprising a hue component, the hue component indicating a target hue and a variation degree by which the foreground image pixel is tinted toward the target hue from a base hue;
 the network server being further programmed to provide an executable application along with an individual image, the executable application being executable by the requesting client to calculate a pixel hue for each pixel of the foreground image based upon a substitute hue selected by a user;
 wherein calculating the pixel hue for a particular pixel includes tinting the substitute hue toward the pixel's target hue by the pixel's variation degree.

17. A network system as recited in claim 16, wherein the variation degree for a particular pixel is specified as a fraction of the difference between the base hue and the pixel's target hue.

18. A network system as recited in claim 16, wherein each of the foreground image pixels includes:
 a luminance variance that indicates the difference in luminance between the pixel and a base luminance;
 a saturation variance that indicates the difference in saturation between the pixel and a base saturation.

19. A network system as recited in claim 16, wherein each of the foreground image pixels includes:
 a luminance variance that indicates the difference in luminance between the pixel and a base luminance;
 a saturation variance that indicates the difference in saturation between the pixel and a base saturation;
 wherein the executable application is executable to perform steps comprising:
  calculating a pixel luminance for each identified pixel based on a base luminance selected by the user, wherein the pixel luminance is equal to the substitute luminance adjusted by the luminance variance;
  calculating a pixel saturation for each identified pixel based on a base saturation selected by the user, wherein the pixel saturation is equal to the substitute saturation adjusted by the saturation variance.

20. A network client programmed to perform steps comprising:
 requesting a digitized image from a network server;
 receiving the digitized image in a format comprising:
  a background image comprising a plurality of pixels;
  a foreground image of an object that can be changed to different colors, the foreground image comprising a plurality of pixels;
  wherein each of the foreground image pixels comprising a hue component, the hue component indicating a target hue and a variation degree by which the foreground image pixel is tinted toward the target hue from a base hue;
 calculating a pixel hue for each pixel of the foreground image based upon a substitute hue selected by a user;
 wherein calculating the pixel hue for a particular pixel includes tinting the substitute hue toward the pixel's target hue by the pixel's variation degree.

21. A network client as recited in claim 20, wherein the variation degree for a particular pixel is specified as a fraction of the difference between the base hue and the pixel's target hue.

22. A network client as recited in claim 20, wherein each of the foreground image pixels includes:
 a luminance variance that indicates the difference in luminance between the pixel and a base luminance;

a saturation variance that indicates the difference in saturation between the pixel and a base saturation.

23. A network client as recited in claim 20, wherein each of the foreground image pixels includes:

a luminance variance that indicates the difference in luminance between the pixel and a base luminance;

a saturation variance that indicates the difference in saturation between the pixel and a base saturation;

wherein the client is programmed to perform further steps comprising:

calculating a pixel luminance for each identified pixel based on a base luminance selected by the user, wherein the pixel luminance is equal to the substitute luminance adjusted by the luminance variance;

calculating a pixel saturation for each identified pixel based on a base saturation selected by the user, wherein the pixel saturation is equal to the substitute saturation adjusted by the saturation variance.

* * * * *